Aug. 28, 1956　　　F. G. WILLIAMS, JR　　　2,760,922
METHOD AND APPARATUS FOR EQUILIBRATING A GAS
WITH A LIQUID AND FOR ANALYZING A GAS
Filed Oct. 31, 1950　　　　　　　　　　　　　　　4 Sheets-Sheet 1
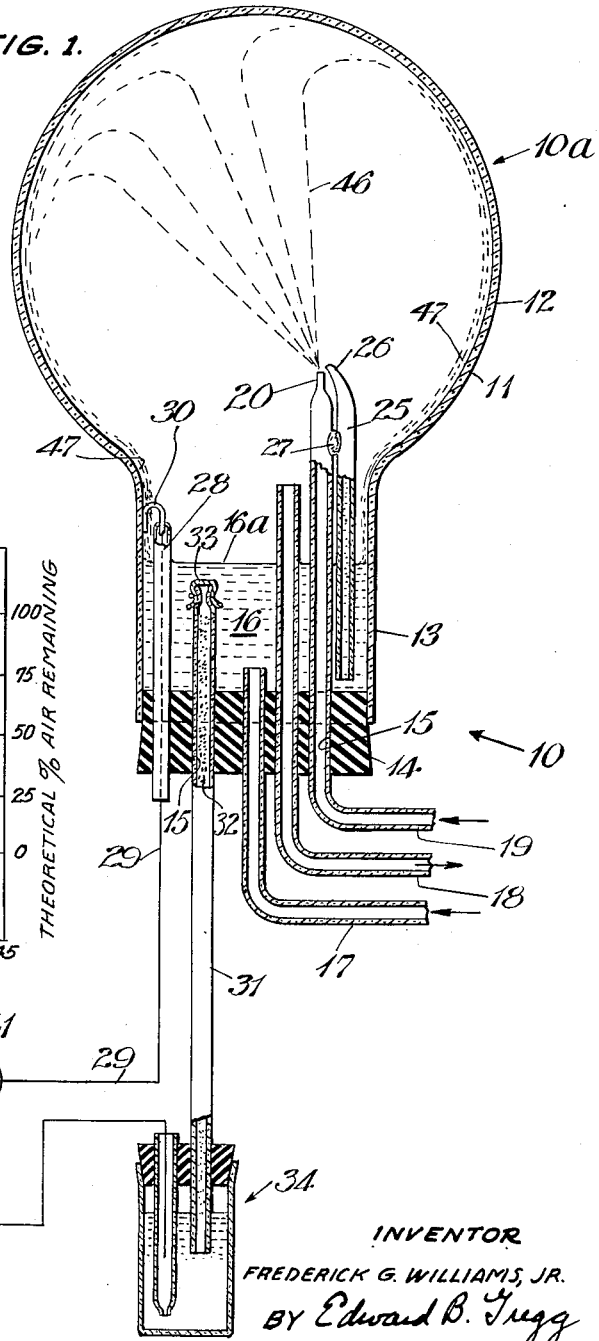
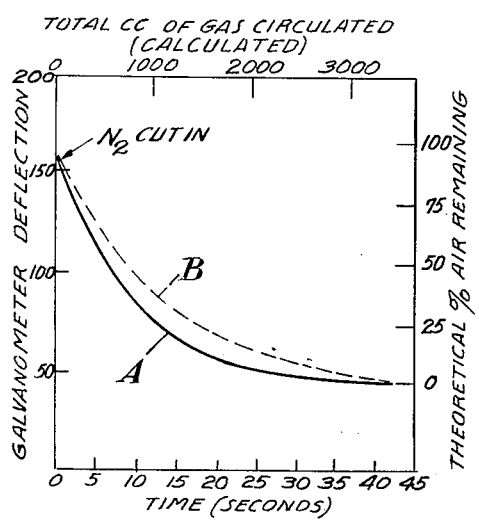
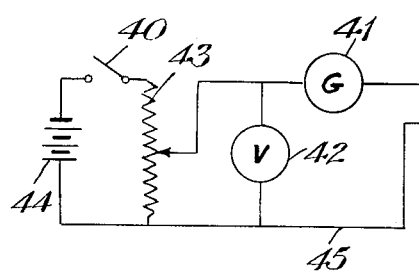
INVENTOR
FREDERICK G. WILLIAMS, JR.
BY Edward B. Trigg
ATTORNEY Aug. 28, 1956 F. G. WILLIAMS, JR 2,760,922
METHOD AND APPARATUS FOR EQUILIBRATING A GAS
WITH A LIQUID AND FOR ANALYZING A GAS
Filed Oct. 31, 1950 4 Sheets-Sheet 2
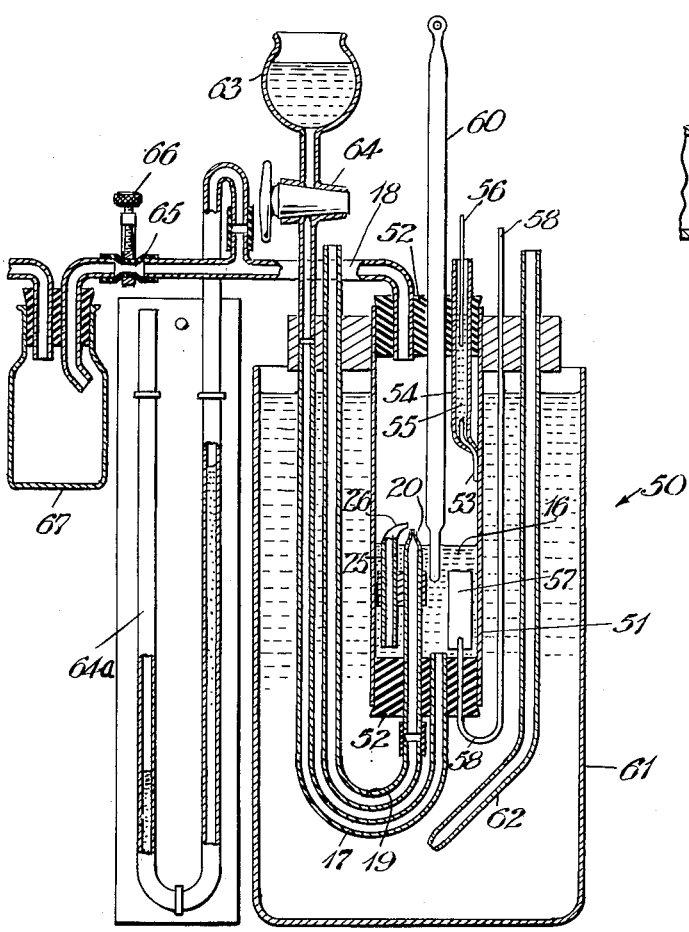
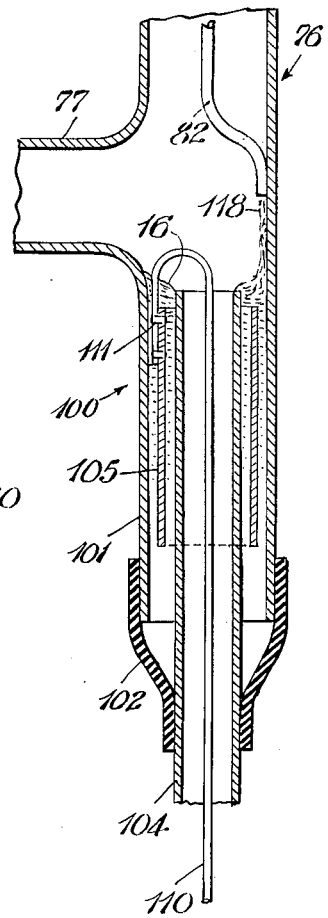
INVENTOR
FREDERICK G. WILLIAMS, JR.
BY Edward B. Gregg
ATTORNEY Aug. 28, 1956　　F. G. WILLIAMS, JR　　2,760,922
METHOD AND APPARATUS FOR EQUILIBRATING A GAS
WITH A LIQUID AND FOR ANALYZING A GAS
Filed Oct. 31, 1950　　　　　　　　　　　　4 Sheets-Sheet 3
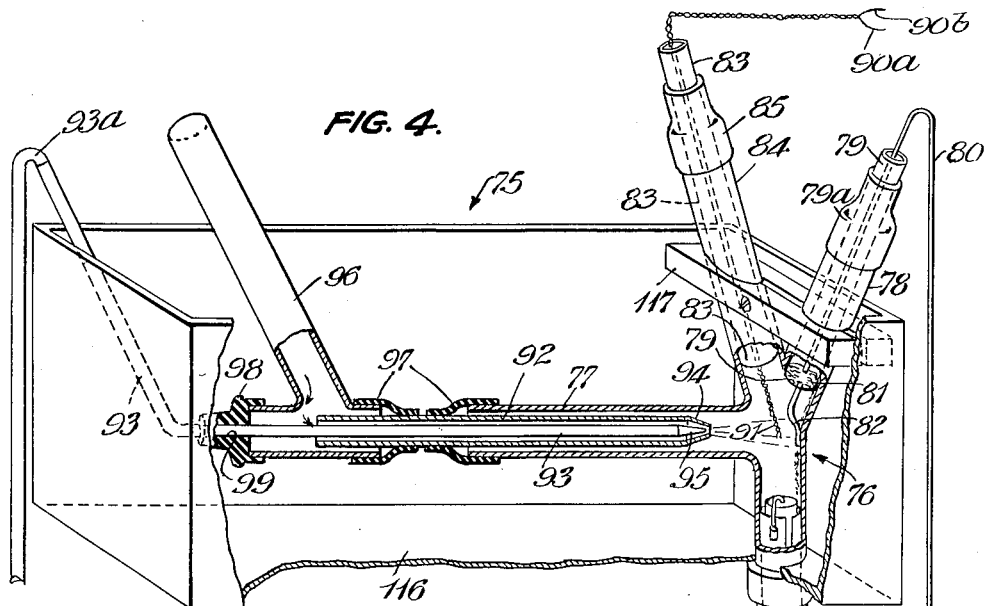
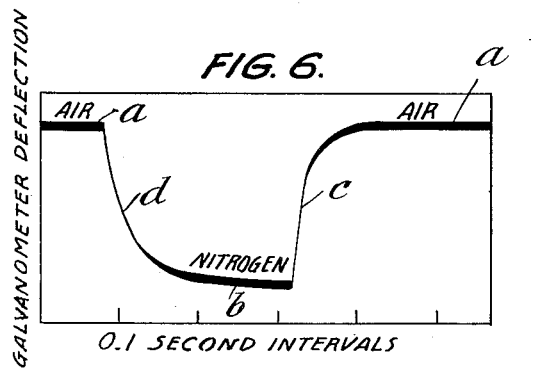
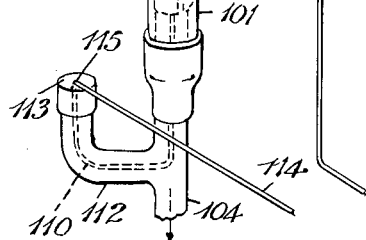
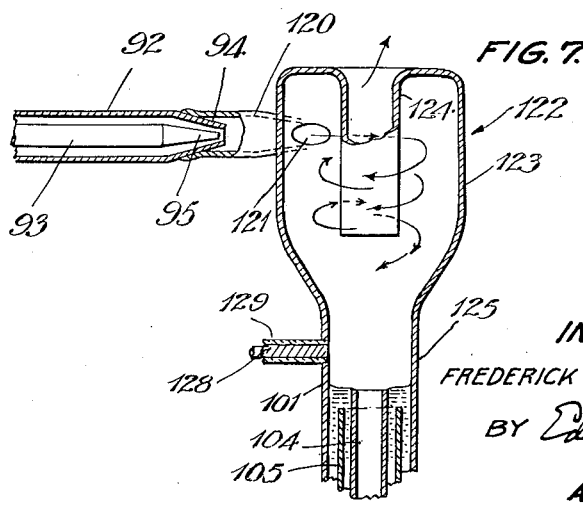
INVENTOR
FREDERICK G. WILLIAMS, JR.
BY Edward B. Gugg
ATTORNEY Aug. 28, 1956     F. G. WILLIAMS, JR     2,760,922
METHOD AND APPARATUS FOR EQUILIBRATING A GAS
WITH A LIQUID AND FOR ANALYZING A GAS
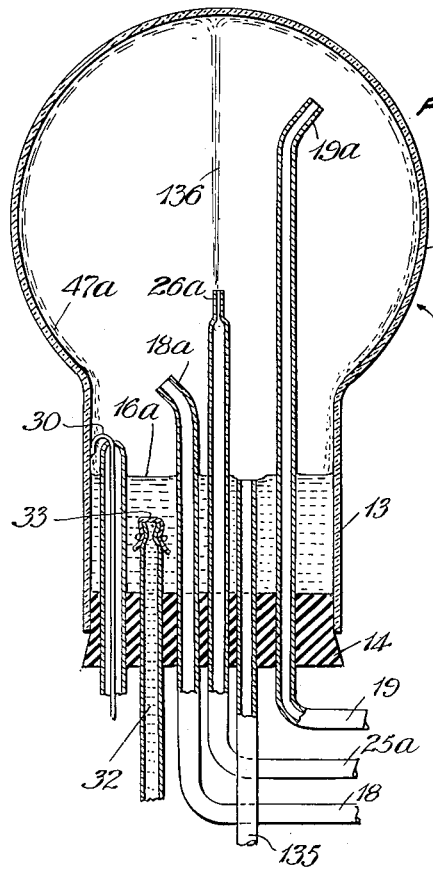
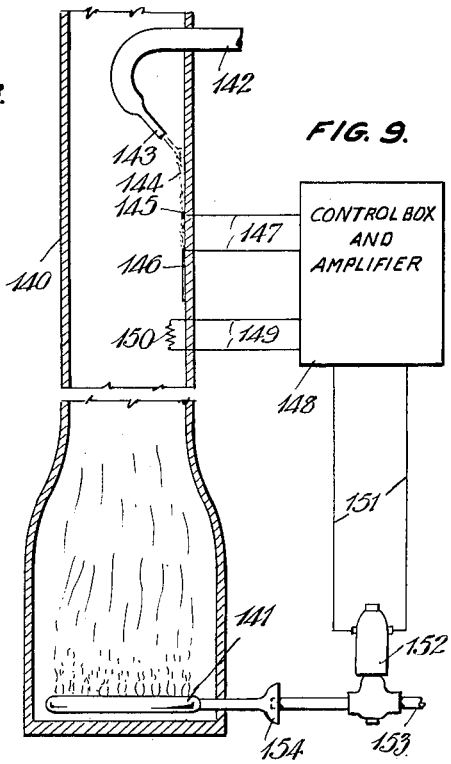
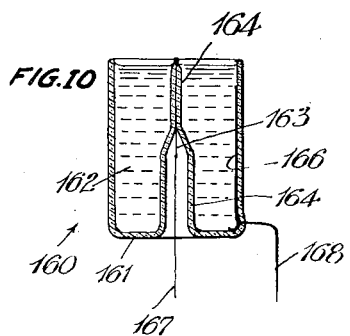
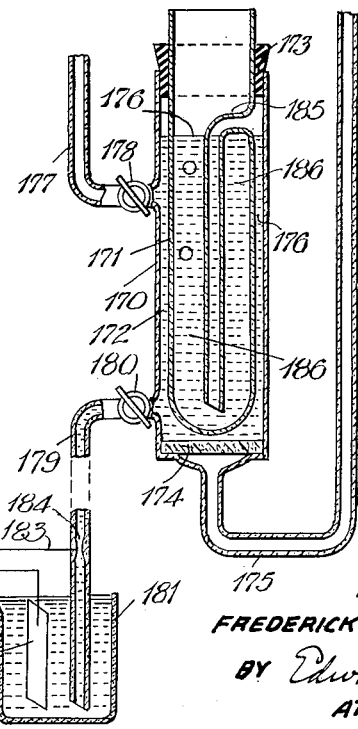
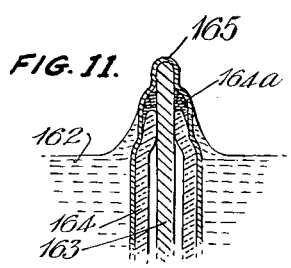
INVENTOR
FREDERICK G. WILLIAMS, JR.
BY Edward B. Gregg
ATTORNEY

United States Patent Office 2,760,922
Patented Aug. 28, 1956

2,760,922

METHOD AND APPARATUS FOR EQUILIBRAT-ING A GAS WITH A LIQUID AND FOR ANALYZING A GAS

Frederick G. Williams, Jr., Redwood City, Calif.

Application October 31, 1950, Serial No. 193,131

9 Claims. (Cl. 204—1)

This invention relates to a method and to apparatus particularly adapted to rapidly and continuously equiliberate a gas with a liquid and to analyze the gas for a specific component such as oxygen.

As used herein the phrase "equilibrate a gas with a liquid," or other equivalent phraseology, is intended to convey the concept of saturating a liquid with a gas and it is not intended to mean, necessarily, that the gas is saturated with a liquid.

An important application of the method and apparatus of the present invention is the amperometric or polargraphic analysis of a gas to determine the oxygen content thereof. Molecular oxygen has a characteristic and distinct reduction potential lending itself to determination with an electrolytic cell in which the oxygen is reduced at the cathode. Dropping mercury and other electrodes are available for this purpose.

In such a process the oxygen must dissolve in a suitable electrolyte, and, in cells of prior construction, it must then diffuse from the body of electrolyte to the cathode. The latter process, i. e. diffusion, is so slow that in many cells of prior design it has not been possible to obtain a sufficiently rapid response of the current or voltage in the external circuit of the cell, to fluctuations of oxygen concentration in the gas. Various expedients have been employed, such as the dropping mercury electrode, rotating electrodes and shielding of the electrode, but all of these expedients either do not achieve the object of rapid response to fluctuating oxygen concentration or partial pressure, and/or require elaborate apparatus and a high degree of skill in manipulation.

It is one of the objects of the present invention to provide an amperometric apparatus and method for determining the concentration of oxygen in a gas, which provide continuous and rapid equilibrium between the gas and the electrode at which oxygen is reduced, and which reduce to a minimum any lag owing to diffusion of dissolved oxygen from the electrolyte to the electrode.

The invention has wider applications, and includes a novel method and novel apparatus for achieving gas-liquid equilibrium, and a novel method and novel apparatus for continuously supplying an electrode with equilibrated liquid electrolyte. Certain of these applications are best discussed after a more specific description of the invention and are, therefore, discussed hereinafter.

Among the several more particular objects of the invention may be mentioned the following:

It is an object of the invention to shorten the response period between a change of oxygen partial pressure in a gas and the current or voltage registered in the external circuit of an electrolytic cell in which oxygen is reduced at the cathode.

It is another object to provide means for amperometrically determining the amount of oxygen in a gas which is adapted to continuous or to intermittent sampling operations and which is characterized by a quick response.

It is a still further object of the invention to provide an analyzer capable of determining the amount of oxygen in a gas, which is operable with very small samples of gas.

Yet another object of the invention is to provide an analyzer capable of determining the quantity of oxygen in a gas and which provides reproducible measurements.

Another object of the invention is to provide an oxygen analyzer which is relatively simple in its construction and operation and can be operated by a semi-skilled operator without the necessity of a long period of training and careful personnel selection.

Yet another object is to provide a method of oxygen measurement which will measure and record the instantaneous oxygen content of a gas having a fluctuating oxygen partial pressure, and which is operable with small samples of gas.

Another object is to provide a novel and more rapid and efficient means of equilibrating a gas with a liquid, whether for amperometric purposes or for other purposes.

These and other objects of the invention will be apparent from the ensuing description and the appended claims.

Certain forms of the invention are illustrated by way of example in the accompanying drawings and are described in detail hereinafter.

In the drawings:

Figure 1 is a sectional view of one form of analyzer constructed in accordance with the invention.

Figure 2 is a graph illustrating the rapid response of the analyzer of Figure 1 to changes of oxygen partial pressure.

Figure 3 is a sectional view of another form of analyzer constructed in accordance with the invention.

Figure 4 is a perspective view of a third, and preferred form of analyzer, which is shown broken away in part for the purpose of clarity.

Figure 5 is a fragmentary view on a larger scale than that of Figure 4, showing the anode assembly of the analyzer of Figure 4.

Figure 6 is a graph illustrating the quick response of the analyzer of Figure 4.

Figure 7 is a fragmentary view of a modification of the analyzer of Figure 4.

Figure 8 is a sectional view of a modification of the analyzer of Figure 1.

Figure 9 is a diagrammatic view of a simplified form of analyzer constructed according to the principles of the present invention, and showing the same embodied in a control circuit.

Figure 10 is a sectional view of yet another form of analyzer constructed in accordance with the invention.

Figure 11 is a fragmentary view, on a larger scale than that of Figure 10, showing the cathode structure in detail.

Figure 12 is a sectional view of yet another form of analyzer constructed in accordance with the invention.

Referring now to Figure 1 of the drawings, which is a diagrammatic view of one form of oxidation-reduction cell suitable as an analyzer, and also illustrates a simple form of external circuit for the cell, the analyzer there illustrated, which is generally designated by the numeral 10 and includes a cathode half-cell assembly 10a, comprises an inverted round-bottomed flask 11 having a body portion or equilibration vessel 12 and a neck 13. This flask is supported in inverted, vertical position by any suitable means (not shown) and at its lower end it is stoppered by means of a rubber stopper 14 which is formed with vertical passages 15 to receive the various inlet and outlet tubes described hereinafter. A body of electrolyte 16 is maintained in a body portion or equilibration vessel 12 at a level 16a, in the manner explained hereinafter. This electrolyte may be of any suitable type, for example, 0.1 molar Na₂HPO₄. An electrolyte supply tube 17 is provided, one end of which extends through the central passage 15 and terminates in the body of the electrolyte somewhat above the upper end of the stopper 14 but well below the level 16a of the electrolyte. The tube is connected to any suitable vessel such as a funnel provided with a stopcock (not shown), for maintaining an adequate reservoir of electrolyte and for adjusting and maintaining the electrolyte level at 16a. A suction or exhaust tube 18 is also provided which extends above the level 16a of the electrolyte, and whose other end is connected by any suitable means to a suction apparatus for maintaining any desired degree of suction and for reducing the pressure in the vessel 12. A gas supply tube 19 is provided which also extends through one of the passages 15 and which terminates well above the electrolyte level 16a. It is formed at its upper end, within the vessel 12, with a constricted tip or nozzle 20. The other end of the gas supply tube 19 is connected to a source of the gas which is being subjected to analysis. An electrolyte suction tube 25 is provided which is disposed entirely within the flask 11 and is supported therein by any suitable means, as by cementing it at 27 to the tube 19. It is drawn out and constricted at its upper end to provide a tip or nozzle 26 adjacent the nozzle 20 of the gas supply tube 19. A tube 28 is also provided which extends through one of the vertical passages 15 and is sealed at its upper end. A wire lead 29 extends through the tube 28 and is soldered or otherwise electrically connected to a platinum electrode 30. The electrode 30, which constitutes the cathode of the cell, may be of any suitable construction but is conveniently in the form of a wire of about 24 gauge. Also, it is bent, as shown, into a U-shape so that it is in actual physical contact with the flask 11 above the electrolyte level 16a. A tube 31 is provided which also extends through one of the vertical passages 15 and contains a salt bridge such as a KCl solution or agar gel indicated as 32. To prevent the material of the salt bridge from being sucked out by the reduced pressure in the vessel 11, and to prevent its being leached by the electrolyte 16, a porous membrane 33 is provided, for example, a cellophane membrane, which covers the open upper end of the tube 31.

As illustrated, a half-cell 34 is provided as the anode. This may be of any suitable construction, for example, a calomel half-cell. Electrolytic connection between the anode half-cell 34 and the cathode half-cell assembly 10a is provided by means of the aforementioned salt bridge 32. The external circuit includes the lead 29, a switch 40, a galvanometer 41, a volt meter 42, a voltage dividing resistance 43, a battery or other source of direct current voltage 44, and a lead 45.

In operation the voltage dividing resistance 43 is tapped at a suitable point to impress the desired voltage on the cell. Suction is applied to the interior of the vessel 12 through the tube 18 and gas under analysis is supplied, under a suitable pressure, e. g. atmospheric pressure, through the tube 19. The juxtaposition and form of the nozzles 20 and 26 of the tubes 19 and 25 is such that an aspirating effect is produced, which sucks the electrolyte 16 up through the tube 25 and forms a spray or fine mist which is generally indicated by the numeral 46. This mist will effect a very intimate contact between the electrolyte and the gas; it will produce and maintain almost instantaneous equilibrium between the gas and electrolyte; and when the mist strikes the walls of the vessel 12 the electrolyte will separate, will flow down the walls of the vessel as a continuous sheet or film indicated by dashed lines 47, and will continuously bathe the electrode 30 in the form of a continuously moving, continuously equilibrated film. This film will complete a circuit comprising the cathode 30, the film 47, the body of electrolyte 16, the salt bridge 32, the anode half-cell 34 and the external circuit shown in Figure 1. Amperometric analysis will, therefore, proceed as long as gas is supplied through the tube 19.

Referring now to Figure 2, abscissae along the bottom scale represent lapsed time in seconds and ordinates along the left-hand scale represent deflections of the galvanometer 41 in arbitrary units. Ordinates along the right-hand scale represent the theoretrical or calculated amount of air remaining in the vessel 12 and abscissae along the upper scale represent the total volume of gas circulated, in cubic centimeters. Two curves, A and B, were plotted. Curve A is plotted against the left-hand ordinate scale (galvanometer deflections) and the bottom abscissa scale (time). Curve B is plotted against the right-hand ordinate scale and the top abscissa scale. In providing the data for constructing curves A and B, the following procedure was employed:

Air was passed through the vessel 12 for a sufficient time to insure complete equilibration. Then, by means of a valve, nitrogen was substituted for air and the galvanometer deflection was noted at the instant of substitution and at five-second intervals thereafter. The curve A was drawn through points so located. The diminishing concentration of oxygen in the vessel 12 was calculated by well-known methods, employing as quantitative data the pressure prevailing in the vessel 12, and the rate of supply of nitrogen to the vessel. From points so located, the curve B was constructed. It will be apparent that curve A nearly conicides with curve B, thus indicating a very rapid response of the galvanometer, hence of equilibration and the electrochemical processes, to the diminishing partial pressure of oxygen in the vessel 12.

Referring now to Figure 3, another embodiment of the invention is there illustrated having certain advantages over that illustrated in Figure 1.

Referring to Figure 3, a complete cell is shown at 50 and it comprises a tubular vessel 51 closed at both ends by rubber stoppers 52 which are suitably drilled to provide passages for the necessary tubes and the other elements or appurtenances of the cell. The cathode is shown at 53 in the form of a platinum wire which extends through the sealed end of a glass tube 54 and is in electrical contact with a pool of mercury or other suitable conducting material shown at 55. The mercury is in electrical contact with a lead 56. As shown, the platinum electrode 53 lies flat against the interior surface of the vessel 51. Instead of providing an external calomel half-cell and a connecting salt bridge as in the cell of Figure 1, a silver-silver chloride electrode or half-cell 57 is provided which may be of the standard construction; that is, it is formed by a strip or plate of metallic silver electrolytically coated with silver chloride, and it is connected to an insulated lead 58. Leads 56 and 58 are, of course, connected to the external circuit of the cell, which may be the same as that shown in Figure 1. A body of electrolyte 16 is maintained in the vessel 51 and supply tubes and a suction tube are provided as in the case of the cell of Figure 1 and are similarly numbered. In addition, and to more clearly illustrate the operation of the cell, certain other elements are shown which were used to study the operational characteristics of the cell. These include a thermometer 60 whose bulb extends below the surface of the electrolyte 16, a water bath 61, a bubbler tube 62 for agitating the water in the bath 61, a thistle tube 63 having a stopcock 64 for maintaining the level of electrolyte in the cell, a manometer 64a, a rubber hose connection 65, a clamp 66 for controlling the degree of suction and a trap 67.

An important advantage of this form of cell and analyzer is, that it eliminates a salt bridge and thus eliminates the possibility that the contents of a salt bridge, such as that shown in Figure 1, will be sucked or leached out of the bridge. Also, the apparatus of Figure 3 is simpler and more compact.

Referring now to Figure 4, a form of analyzer is there illustrated which has certain advantages over those of Figures 1 and 3, as explained in detail hereinafter. The analyzer as a whole is indicated by the reference numeral 75. It comprises a vertical Y-tube 76 having a horizontal arm or branch 77. One branch of the Y, indicated as 78, contains a tube 79 which is sealed at its lower end, extends through the upper end of the branch 78 and is sealed thereto by means of a length of rubber tubing 79a. A lead 80 extends through the tube 78 and has its lower end submerged in a pool of mercury 81. A platinum cathode 82 is provided which extends through and is sealed to the lower end of the tube 79, and is in electrical contact with the pool of mercury 81. At its lower end the platinum cathode 82, which may be in the form of a 24-gauge platinum wire, is bent reversely and then vertically so as to be in registry with the horizontal arm 77 of the Y-tube 76 and to be adjacent the wall of the Y-tube. A tube 83 is disposed in and extends through the upper end of the other branch 84 of the Y-tube, and is sealed by means of a length of rubber tubing 85. A pair of leads 90a and 90b of copper and constantan, respectively, extend through the tube 83 and through the lower sealed end thereof, below which they are connected to form a copper-constantan thermo-couple element 91. The leads 90a and 90b are, of course, suitably connected at their other ends to form a cold junction, and the thermo-couple element 91 is located more or less in registry with the platinum cathode 82 and with the horizontal arm 77 to measure the temperature of liquid electrolyte which is sprayed onto the cathode in the manner described hereinafter.

Gas and electrolyte supply tubes 92 and 93, respectively, are arranged within the horizontal arm 77 and concentrically thereto. They are formed at their inner ends with constricted tips or nozzles 94 and 95, respectively. A T-tube 96 is connected by means of lengths of rubber tube 97 to the horizontal arm 77. The lengths of rubber tubing 97 also serve to support and center the gas supply tube 92. The outer or left-hand end of the gas supply tube 92 is open and in communication with the T-tube 96 so that the path of travel of gas introduced through the T-tube 96 is in the direction of the arrows. The extreme outer or left-hand end of the T-tube 96 is closed by means of a rubber cap 98 which is formed with a passage 99 to receive the electrolyte tube 93. The outer or left-hand end of the tube 93 is connected by means of a length of rubber tube 93a to a suitable source of electrolyte (not shown).

Referring now more particularly to Figure 5, which is a fragmentary detail of a portion of the analyzer 75, the anode assembly is there shown in detail and is generally designated by the numeral 100. The vertical portion or leg 101 of the Y-tube 76 provides a vessel for containing a supply of electrolyte 16, and at its lower end it is connected by a length of rubber tubing 102 to a suction or exhaust tube 104 which extends vertically and concentrically through the vertical leg 101 to a point below the junction of the horizontal arm 77 and the Y-tube 76. The anode proper, which is designated by the numeral 105, is of tubular construction. It is a silver-silver chloride electrode or half-cell and is arranged concentrically of the suction tube 104 and the vertical leg 101, being supported and positioned by the rigidity of a lead 110 and, if necessary, by any other suitable means (not shown). The lead 110 is riveted at 111 to the anode 105. As shown in Figure 4, the suction tube 104 is provided with a lateral branch or arm 112 through which the lead 110 extends, and at its upper end the branch 112 is closed by a cap 113. A lead 114 is soldered at 115 to the interior lead 110. The leads 80 and 114 are, of course, connected to a suitable external circuit, such as that shown in Figure 1.

As illustrated in Figure 4, the entire assembly except the lower portion of the anode assembly is mounted in a vessel 116, as by means of a bracket or clamp 117. The vessel 116 may be filled with water or other suitable liquid whose temperature is regulated to control and maintain the temperature of the analyzer.

In operation, the analyzer 75 of Figures 4 and 5 is manipulated in essentially the same manner as the analyzer of Figure 1. That is, a voltage is impressed upon the cell, which may be varied to provide data for a current-voltage diagram. Meanwhile, the gas under analysis is introduced under suitable pressure through the T-tube 96 and a supply of electrolyte is provided for the electrolyte tube 93. An aspirating effect is produced by rapid passage of gas through the annular space between the nozzles 94 and 95. This will suck electrolyte through the electrolyte tube 93 and will form a fine mist which will impinge upon and bathe the cathode 82. Electrical contact between the cathode 82 and the anode 105 is provided by means of the film of electrolyte shown at 118 in Figure 5, which flows from the cathode down along the walls of the Y-tube 76 to the body of electrolyte.

The embodiment of the invention shown in Figures 4 and 5 possesses several advantages as compared with those embodiments illustrated in Figures 1 and 3. Thus, the exhaust tube 104 provides, in effect, a standpipe which controls the level of the electrolyte 16. This electrolyte is supplied continuously through the tube 93, and overflow through tube 104 maintains a constant level of electrolyte. This is of importance for the following, among other reasons:

The film 118 of electrolyte constitutes an important element of resistance in the circuit. Consequently, if it varies in dimensions, the characteristics of the cell will vary. By maintaining a constant level of electrolyte in the equilibration vessel, the apparatus of Figures 4 and 5 maintains a film 118 of constant dimensions, hence constant resistance. Also, the anode is at all times completely immersed in the electrolyte, which ensures a constant anode area.

Referring now to Figure 6, in the graph there shown in which abscissae represent time in 0.1 second intervals and ordinates represent galvanometer deflections. The curve shown was obtained with the analyzer of Figure 4 in the following manner: A supply of air and a supply of nitrogen were provided. By rapid switching of a two-way valve, air and nitrogen were supplied alternately to the gas supply tube 92 and the deflections of a galvanometer in an external circuit similar to that illustrated in Figure 1 were recorded on a constant speed drum. The high plateaus $a$ were obtained with air and the low plateaus $b$ were obtained with nitrogen. The descending and ascending portions $c$ and $d$ correspond to transition periods between equilibration of the cathode with air and with nitrogen, respectively. The steep slope of the portions $c$ and $d$ indicates the rapid response of the analyzer of Figure 4.

Referring now to Figure 7, in which certain of the elements are numbered as in Figures 4 and 5, the gas and electrolyte supply tubes 92 and 93, respectively, and their nozzles 94 and 95 are arranged as in Figure 4 to produce an aspirating effect and to form a mist. However, the end of the gas supply tube 92 is connected to one end of a tube 120, which is preferably a straight length of tube to minimize separation of the liquid from the gas and is of a sufficient length in relation to the rate of travel of the mist to allow complete equilibrium to be reached. At its other end the tube 120 communicates through a tangential opening 121 with the interior of a cyclone separator 122 which comprises a tubular cyclone body 123, a vapor outlet pipe 124 which is arranged co-axially of the body 123, and a liquid downcomer pipe 125. In a cyclone separator of the type illustrated, the radial acceleration imparted to a gas-liquid mixture as it enters the cyclone and travels in a spiral path, will separate the liquid from the gas almost instantly. The separated, equilibrated liquid will flow down the pipe 125 and over a cathode 128. The cathode 128 may be a platinum wire sealed into and extending through the wall of the downcomer pipe 125, suitably shielded and insulated by a glass tube 129, or it may be a body of mercury of capillary dimensions within the tube 129 and held therein by surface tension.

A modification of the apparatus of Figure 1 is illustrated in Figure 8. This modification does not employ an aspirator and does not rely upon a mist for equilibration of the electrolyte with gas.

Referring to Figure 8, in which most of the elements are numbered as in Figure 1, the electrolyte level 16a is maintained by a standpipe 135, and the electrolyte supply tube 25a, instead of opening into the body of electrolyte 16 in the equilibration vessel 11, extends through the stopper 14 and is connected to a suitable, external source of electrolyte (not shown). The electrolyte supply tube 25a terminates in a restricted tip or nozzle 26a which directs a jet 136 of electrolyte onto the interior surface of the vessel 11 at the top thereof. This provides a thin film 47a of electrolyte which flows down the interior walls of the vessel and is in contact with gas introduced through the gas supply tube 19. The latter is not necessarily formed with a restricted tip or nozzle and, instead, is inclined to the right at 19a (as viewed in Figure 8) while the upper end 18a of the exhaust tube 18 is inclined in the opposite direction to avoid chanelling of the gas.

In operation, the electrolyte is continuously, efficiently and rapidly equilibrated with the gas by reason of the extensive gas-liquid interface and the thinness of the film 47a, and without the necessity of forming a mist or spray.

Referring now to Figure 9, there is shown a practical application of the concept of a gas-liquid film interface for equilibration purposes. A flue 140 and a burner 141 are shown. Within the flue a simple form of oxygen analyzer is provided in the form of a tube 142 to supply electrolyte through its nozzle 143 as a thin film 144 flowing down the wall of the flue. If desired, the critical portions of the analyzer may be shielded. The film 144 flows over a platinum or other suitable cathode at 145, thence to and over a reference anode at 146. Leads 147 connect the simple electrolytic cell thus provided, with a control box and amplifier 148 which may also be connected, as by leads 149, to a temperature compensating resistance 150. The cell constituted by the electrodes 145 and 146 and the film 144 is, of course, affected by the ambient temperature, hence the advisability of a temperature compensating resistance as shown at 150. The control box 148 is shown as being connected by leads 151 to an electrically operated valve 152 in the fuel supply line 153 for the burner 141. An air intake 154 is also shown.

In operation, the control box 148 will be adjusted to maintain a constant, optimum oxygen content in the flue gas. It is known that under optimum conditions, i. e., optimum balance of fuel consumption and heat production, the combustion should yield flue gases containing about 8% oxygen. The control box 148 can, therefore, be adjusted so that if the oxygen content of the flue gas exceeds 8%, the analyzer will operate to open the valve 152 to a greater degree, hence admit more fuel. If the oxygen content of the flue gas falls below 8%, the fuel supply will be diminished by partial closing of the valve 152.

Referring now to Figures 10 and 11, another form of analyzer is there illustrated and is generally designated as 160. The analyzer comprises a glass vessel 161 containing an electrolyte 162 and having a platinum cathode 163 extending axially and upwardly through a tube 164. The electrode extends through the upper end of the tube 164, which may be sealed by lacquer or cement at 164a, and is coated with a wick 165, the thickness of which has been exaggerated for illustrative purposes. Gelatin or other suitable material capable of absorbing the electrolyte and acting as a wick may be employed for this purpose. An anode is provided in the form of a silver-chloride-coated silver mirror 166 coating the interior surface of the vessel 161. Leads 167 and 168 are provided for the cathode and anode, respectively.

In operation, this form of analyzer is employed as follows: A gas is passed over the wick 164, or the wick is exposed to a gaseous atmosphere which it is desired to analyze. The wick 164 will, of course, be saturated with electrolyte, and if the wick is quite thin a continuous equilibrium will be maintained between the gas and the cathode 163. The leads 167 and 168 will, of course, be connected to a suitable external circuit which will register current and/or voltage fluctuations as a measure of fluctuating oxygen concentration in the gaseous phase.

Yet another embodiment of the invention is illustrated in Figure 12. A glass tube 170 is provided, within which is disposed another glass tube 171 to provide a thin annular space 172. The upper end of the outer tube 170 is fitted with a rubber stopper 173 which supports the inner tube 171, and the lower end of tube 170 is fitted with a fritted glass disc 174. Gas under analysis is delivered through a tube 175 and is bubbled by means of the disc 174 through a body of electrolyte 176 in the annular space 172. Electrolyte is supplied through a tube 177 having a stopcock 178 and is drained through a tube 179 having a stopcock 180 into a beaker 181 containing a silver-silver chloride anode 182. A platinum wire 183 extends through and is sealed to a constricted portion 184 of the tube 179, thus providing a cathode. Gas bubbled through the electrolyte 176 escapes through a tube 185 and a water trap 186.

In operation, the electrolyte is continuously equilibrated with the gas by the fine bubbles of gas passed therethrough. The thinness of the annular space 172 contributes to rapid equilibration. The diffusion factor at the cathode 183 is minimized by the constricted passage 184 and the continuous flow of fresh, equilibrated electrolyte past the cathode.

The apparatus and method of the present invention, in the various forms illustrated in the drawings and described hereinabove, have been discussed mainly in connection with gas analysis to determine oxygen concentration. Both the apparatus and the method have, however, wider applications.

Thus, the method and apparatus for gas-liquid equilibration have general applicability apart from the purpose of equilibrating an electrode with a gas. Also, any gas, having a component which possesses a distinctive oxidation or reduction potential, can be determined by the method and apparatus of the invention. Thus, hydrogen cyanide gas is susceptible of determination provided a suitable electrolyte, such as aqueous $KNO_3$ or $KOH$, is employed at an appropriate applied potential.

Another application is the amperometric determination of ions such as lead, thallium, tin, cadmium, chromium, zinc, nickel, cobalt, iron, manganese and aluminum ions. Oxygen interferes with the amperometric determination of these ions when dissolved in a suitable electrolyte, such as aqueous $KCl$, containing dissolved oxygen. In accordance with the present invention a solution of one or more of these ions may be sprayed as a mist with nitrogen or other suitable inert gas, onto an electrode by an aspirator such as illustrated in the various figures of the drawings. The inert gas will rapidly strip the solution of oxygen and permit determination of other ions without interference.

Among the various industrial applications of the method and apparatus of the invention, these may be mentioned: flue gas analysis (illustrated by Figure 9); exhaust gas analysis for internal combustion engines; process gas analysis to determine oxygen in natural gas, coal gas, bottled oxygen and bottled hydrogen; analysis of atmospheres as in mines, submarines and aircraft cabins; oxygen therapy; and physiological studies. The latter may involve respiration studies or metabolism studies in which only small samples of gas are available and in which the oxygen concentration fluctuates rapidly.

The present invention offers certain important advantages, among which may be mentioned the following:

It is adapted to continuous or intermittent amperometric technique, is operable with very small samples of gas and exhibits a very rapid response. It is adapted to measure rapid fluctuations of oxygen in exhaled air. The equilibration method of the invention, especially that which employs an aspirator and in which an electrolyte is aspirated by the gas under analysis to provide a mist, is advantageous because it achieves a very rapid equilibrium and requires only very small samples of gas and electrolyte.

As applied to oxygen analysis, the present invention relies upon a specific, characteristic electrochemical property of oxygen which is more characteristic of oxygen than physical properties such as viscosity, magnetic permeability and thermal conductivity, which do not adequately differentiate oxygen from many other gases with which it is frequently associated. Thus, water vapor interferes with several of the physical methods of analysis but does not interfere with the determination of oxygen by the method and apparatus of the present invention. The present invention, unlike chemical absorption methods, does not involve any appreciable amount of reagent consumption. Also, the method and the apparatus produce a readily measurable current which requires no amplification, and the current has the advantage of a substantially linear relation to the oxygen concentration.

The apparatus employed is very simple from the standpoint of construction and operation and does not require a highly skilled operator for its operation. Also, the method and apparatus are operable over a broad range of oxygen concentration.

Herein and in the appended claims the terms "equilibrate" and "equilibration" are used. Complete equilibration may not, of course, be reached, and as used herein and in the appended claims such terms will be understood to mean a practical approach to equilibrium.

I claim:

1. An oxidation-reduction cell comprising a cathode disposed therein adjacent a wall thereof, aspirator means for creating and maintaining a dispersion of electrolyte in a gas in the form of a mist to saturate the electrolyte with the gas and for continuously bathing said cathode with the saturated electrolyte, and an anode assembly comprising an anode vessel, means for continuously maintaining liquid electrolyte in said anode vessel at a predetermined level and an anode arranged in said anode vessel to be immersed in a body of electrolyte and to be in electrical contact with said cathode through said body of electrolyte and through a film of electrolyte flowing from said cathode to said body of electrolyte.

2. Electrolytic apparatus comprising concentrically arranged inner and outer tubes for communication with a supply of gas to be analyzed and a supply of liquid electrolyte, said tubes terminating in a nozzle operable to aspirate the electrolyte and to produce a fine dispersion of the electrolyte in the gas, a cathode vessel in registry with said nozzle, a cathode in said cathode vessel in registry with said nozzle and adjacent a wall of said vessel, an anode vessel in communication with said cathode vessel, and an inner stand pipe and an outer annular anode arranged concentrically within said cathode vessel with the upper end of said cathode beneath the upper end of said stand pipe.

3. Apparatus capable of continuously and instantaneously measuring the fluctuating concentration of a gaseous component of a body of gas, said gaseous component being capable of being physically dissolved in an electrolyte and being capable, when so dissolved, of an electrolytic reaction at the electrode of a half cell, and of producing an electromotive force at such electrode which is proportional to the concentration of the physically dissolved gaseous component in the electrolyte at the surface of the electrode, said apparatus comprising: a half cell including an electrode capable of effecting such electrolytic reaction; means for maintaining a continuous, rapid flow of liquid electrolyte over the surface of said electrode in the form of a thin film, the thinness of said film being such that the time required for diffusion of said gaseous component through the film to the surface of the electrode is negligible; and means for maintaining a continuous, dynamic equilibrium between said body of gas and such flowing film of electrolyte to maintain said gaseous component in physical solution in such flowing film at a concentration proportional to the instantaneous partial pressure of said gaseous component in said body of gas.

4. Apparatus capable of continuously and instantaneously measuring the fluctuating concentration of a gaseous component of a body of gas, said gaseous component being capable of being physically dissolved in an electrolyte and being capable, when so dissolved, of an electrolytic reaction at the electrode of a half cell, and of producing an electromotive force at such electrode which is proportional to the concentration of the physically dissolved gaseous component in the electrolyte at the surface of the electrode, said apparatus comprising: a half cell including an electrode capable of effecting such electrolytic reaction; means for continuously dispersing a liquid electrolyte in said body of gas to produce a dispersion wherein the dispersed liquid phase is in dynamic physical solution equilibrium with the body of gas; and means for causing the resulting, dynamically equilibrated electrolyte to flow continuously over the surface of said electrode.

5. Apparatus capable of continuously and instantaneously measuring the fluctuating concentration of a gaseous component of a body of gas, said gaseous component being capable of being physically dissolved in an electrolyte and being capable, when so dissolved, of an electrolytic reaction at the electrode of a half cell, and of producing an electromotive force at such electrode which is proportional to the concentration of the physically dissolved gaseous component in the electrolyte at the surface of the electrode, said apparatus comprising: a half cell including an electrode capable of effecting such electrolytic reaction; means for aspirating a liquid electrolyte into a flowing stream of said body of gas to produce a mist of the electrolyte in the gas wherein the finely dispersed electrolyte is in dynamic, physical solution equilibrium with said body of gas; and means for continuously flowing the resulting dynamically equilibrated electrolyte over the surface of said electrode.

6. A method of continuously and instantaneously measuring the fluctuating concentration of a gaseous component of a body of gas, said gaseous component being capable of being physically dissolved in an electrolyte and being capable, when so dissolved, of an electrolytic reaction at the electrode of a half cell and of producing an electromotive force at such electrode which is proportional to the concentration of the physically dissolved gaseous component in the electrolyte at the surface of the electrode, said method comprising: providing such a half cell and also providing a liquid electrolyte; flowing a thin film of said electrolyte over the surface of said electrode, the thinness of said film being such that the time required for diffusion of said gaseous component through the film to the surface of the electrode is negligible and maintaining said body of gas in dynamic physical solution equilibrium with said flowing film of electrolyte.

7. A method of continuously and instantaneously measuring the fluctuating concention of a gaseous component of a body of gas, said gaseous component being capable of being physically dissolved in an electrolyte and being capable, when so dissolved, of an electrolytic reaction at the electrode of a half cell and of producing an electromotive force at such electrode which is proportional to the concentration of the physically dissolved gaseous component in the electrolyte at the surface of the electrode, said method comprising: providing such a half cell and also providing a liquid electrolyte; continuously dispersing the electrolyte in said body of gas to produce and maintain a dynamic, physical solution equilibrium between the gas and the electrolyte; and continuously and directly applying the resulting dynamically equilibrated electrolyte to the surface of said electrode as a flowing body.

8. The method of claim 7 wherein the equilibrated electrolyte is caused to flow over the electrode surface in the form of a thin film.

9. The method of claim 8 wherein said film is in contact with said body of gas and has a thinness such that the time required for diffusion of said gaseous component from the body of gas through the film to the electrode surface is negligible.

References Cited in the file of this patent

UNITED STATES PATENTS

| | | |
|---|---|---|
| 605,685 | Swift | June 19, 1898 |
| 893,354 | McGregor | July 14, 1908 |
| 2,278,248 | Darrah | Mar. 31, 1942 |
| 2,382,735 | Marks | Aug. 14, 1945 |
| 2,437,526 | Heidbrink et al. | Mar. 9, 1948 |
| 2,517,382 | Brinker et al. | Aug. 1, 1950 |
| 2,651,612 | Haller | Sept. 8, 1953 |

FOREIGN PATENTS

| | | |
|---|---|---|
| 578,342 | Germany | June 13, 1933 |
| 802,586 | France | June 13, 1936 |

OTHER REFERENCES

"Journal of the Chemical Society" (London), 1944, pages 1–4.